US006571261B1

(12) United States Patent
Wang-Knop et al.

(10) Patent No.: US 6,571,261 B1
(45) Date of Patent: May 27, 2003

(54) DEFRAGMENTATION UTILITY FOR A SHARED DISK PARALLEL FILE SYSTEM ACROSS A STORAGE AREA NETWORK

(75) Inventors: Kuei-Yu Wang-Knop, Poughkeepsie, NY (US); Robert J. Curran, West Hurley, NY (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 09/616,012

(22) Filed: Jul. 13, 2000

(51) Int. Cl.[7] ............................................. G06F 17/30
(52) U.S. Cl. ....................... 707/206; 707/100; 707/101; 707/200
(58) Field of Search ...................... 707/1–10, 100–102, 707/200–206; 711/170–173

(56) References Cited

U.S. PATENT DOCUMENTS

| | | | | |
|---|---|---|---|---|
| 5,604,902 A | * | 2/1997 | Burkes et al. ............... | 707/206 |
| 5,623,654 A | | 4/1997 | Peterman ..................... | 395/622 |
| 5,802,599 A | | 9/1998 | Cabrera et al. .............. | 711/170 |
| 5,808,821 A | | 9/1998 | Davy ........................... | 360/48 |
| 5,930,828 A | * | 7/1999 | Jensen et al. ................. | 360/48 |
| 5,946,686 A | * | 8/1999 | Schmuck et al. ............. | 707/10 |
| 5,956,745 A | | 9/1999 | Bradford et al. | |
| 6,070,172 A | * | 5/2000 | Lowe .......................... | 707/205 |

OTHER PUBLICATIONS

McAuliffe et al. ("Towards Effective and Efficient Free Space Management", ACM, 1996, pp. 389–400).*

* cited by examiner

*Primary Examiner*—Jean M. Corrielus
*Assistant Examiner*—Joon Hwan Hwang
(74) *Attorney, Agent, or Firm*—Lawrence D. Cutter; Stephen Bongini; Fleit, Kain, Gibbons, Gutman & Bongini P.L.

(57) ABSTRACT

This invention provides a defragmentation utility that works on-line in parallel with other file system activities. Thus, it avoids making the file system unavailable for periods of time which would, if not for this invention, slow down data communication exchange and the execution of other tasks dependent upon the data. In particular, this invention, steps through all of the valid inodes finding each of the fragments. The defragmentation engine decides which fragments must remain in their current location and which fragments should migrate to another disk block sub-block location. Since the data blocks span across multiple disks, for each valid disk of the file system a set of disk blocks are constructed that are chosen to be filled, herein called plates. When the plates become full or reach a certain fullness, they are removed from the set and replaced by other disk blocks. When a disk block is removed from the plate set, it is moved to a "done" list as it is considered "full". While a disk block is in the done list the fragments that belong to that block are not allowed to migrate. Thus, a defragmentation utility that works on-line, avoids locking data structures for long periods of time, is memory efficient, uses sub-blocks for fragment analysis and migration as well as minimizes data movements has been summarized. This utility thereby provides a transparent defragmentation function that operates in the background seamlessly with other system file operations.

20 Claims, 8 Drawing Sheets

DEFRAGMENTATION UTILITY FOR A SHARED DISK PARALLEL FILE SYSTEM ACROSS A STORAGE AREA NETWORK

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention relates to distributed computer systems and more particularly to an improved system and method for allocation of vacant memory space.

BACKGROUND OF THE INVENTION

Distributed database computer systems store enormous amounts of information that can be accessed by users for identification and retrieval of valuable documents that contain data, text, audio, video and other multimedia information. A typical example of a distributed system (100) is shown in FIG. 1. A distributed database computer system consists of computer nodes (104a to 104n) and a communication network (108) that allows the exchange of messages between computer nodes. Multiples storage devices (106a to 106n and 110a to 110z) store data files for the multiple nodes of the distributed system. Storage devices (106a to 106n) are local disks for the nodes (104a to 104n); storage devices (110a to 110z) are global databases accessible by nodes (104a to 104n) via a storage network (102). These nodes work together to achieve a common goal, e.g., a parallel scientific computation, a distributed database, or a parallel file system.

Shared disk file systems allow access to data contained on disks attached by some form of Storage Area Network (SAN). The SAN provides some physical level access to the data on the disk to a number of systems. These shared disks can be split into partitions which provide a shared pool of physical storage without common access or with the aid of a shared disk file system or database manager. SAN can provide coherent access to all the data from all of the systems. IBM's General Parallel File System (GPFS) is a file system which manages a pool of disks across a number of systems allowing high speed direct access from any system and aggregate performance across a single file system which exceeds that available from any file system managed from a single system. This disclosure addresses an aspect of bringing that multi-system power to bear on an aspect of file system operation.

In general, the operation of the file system is a compromise between keeping data placed together on the disks for rapid access and also allowing small files to be stored without great space overhead. A common way of doing that is to store larger files in blocks which effectively use disk bandwidth and also in sub-blocks which are some fraction of a file system block. The normal operation of creation and deletion of data creates unused sub-blocks within file system blocks as shown in FIG. 2. FIG. 2 is a file structure (200) overview illustrating the block and sub-block utilization for a storage device (202a, 202b) in the prior art within which the invention may be practiced.

To take advantage of large block sizes, while a file is open for writing from a database or disk storage (202a, 202b), only full blocks (Blocks N−1, N, N+1, N+2, N+3) are allocated (204a) from a number of contiguous sub-blocks (206). After the last close of the file, the last logical block of the file is shrunk down to the number of sub-blocks that are actually needed (204b). This approach requires that some full blocks be available before any file can be written. During normal file system operation, after many allocation and de-allocation of files, the disks end up fragmented (208) with many free sub-blocks (210) that cannot be used for full block allocation. In such systems, there is a need for a mechanism that allows elimination of holes (unused portions of a disk block, 210) into free full blocks.

To avoid fragmentation of data blocks, defragmentation utilities combine and migrate, in a directed way, fragments occupying part of a block to form fully occupied blocks, and then free the sub-blocks previously used by the migrated fragments. The goal is to increase the number of free full blocks available for allocation. A naive method is to statically gather all information about the fragments in the file system and then combine them together, in the best way, to form entire blocks. However, this approach entails severe performance degradation and space penalties. The performance degradation is because this method freezes the file system usage during defragmentation. The space penalties are due to the large amounts of space for storing fragment information that is used for migrating fragments.

Therefore, there is a need for an improved method and system that overcomes the deficiencies of the prior art methods so that shared disk parallel file systems can be defragmented easily and without the performance and space penalties of the prior art.

SUMMARY OF THE INVENTION

This invention provides a defragmentation utility that works on-line in parallel with other file system activities across multiple computer systems which share direct access to the storage devices which comprise the file system. Thus, it avoids making the file system unavailable for periods of time which would, if not for this invention, slow down data communication exchange and the execution of other tasks dependent upon the data. In order to accomplish the defragmentation process, the utility presented herein locks the file system structures for only short periods of time; system disturbance is thereby minimized and necessary data may be transferred without noticeable effects to the overall processing functions performed within a distributed computer architecture. Also, the defragmentation utility is memory efficient and does not require fully free blocks to perform its defragmentation function; rather, it operates upon sub-blocks of the data blocks that are fragmented. Finally, this utility minimizes the number of data transfers since each of these data movements implies more memory accesses with a corresponding memory access time; reducing the number of memory accesses reduces the total amount of time spent accessing a memory.

In particular, this invention steps through all of. the valid inodes finding each of the fragments. The defragmentation engine decides which fragments must remain in their current location and which fragments should migrate to another disk block sub-block location. Since the data blocks span across multiple disks, for each valid disk of the file system a set of disk blocks is constructed that are chosen to be filled, herein called plates. When the plates become full or reach a certain fullness, they are removed from the set and replaced by other disk blocks. When a disk block is removed from the plate set, it is moved to a "done" list as it is considered "full". While a disk block is in the done list, the fragments that belong to that block are not allowed to migrate. The defragmentation protocols as practiced in this invention includes: 1) if a current fragment belongs to a fully populated disk block, or to a plate, or to a "done" block, then do nothing; 2) if a current fragment belongs to an almost full block, that is, the block occupation is higher than a preestablished threshold, move the block to the done list; 3) attempt to find a suitable hole at least the same size as the fragment or larger in the plate list for the current fragment; and 4) if successful in searching for a suitable hole, then migrating the fragment into that hole and freeing the previously occupied sub-blocks.

Thus, a defragmentation utility that works on-line, avoids locking data structures for long periods of time, is memory efficient, uses sub-blocks for fragment analysis and migration as well as minimizes data movements has been summarized. This utility thereby provides a transparent defragmentation function that operates in the background seamlessly with other system file operations.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

Figure 1:
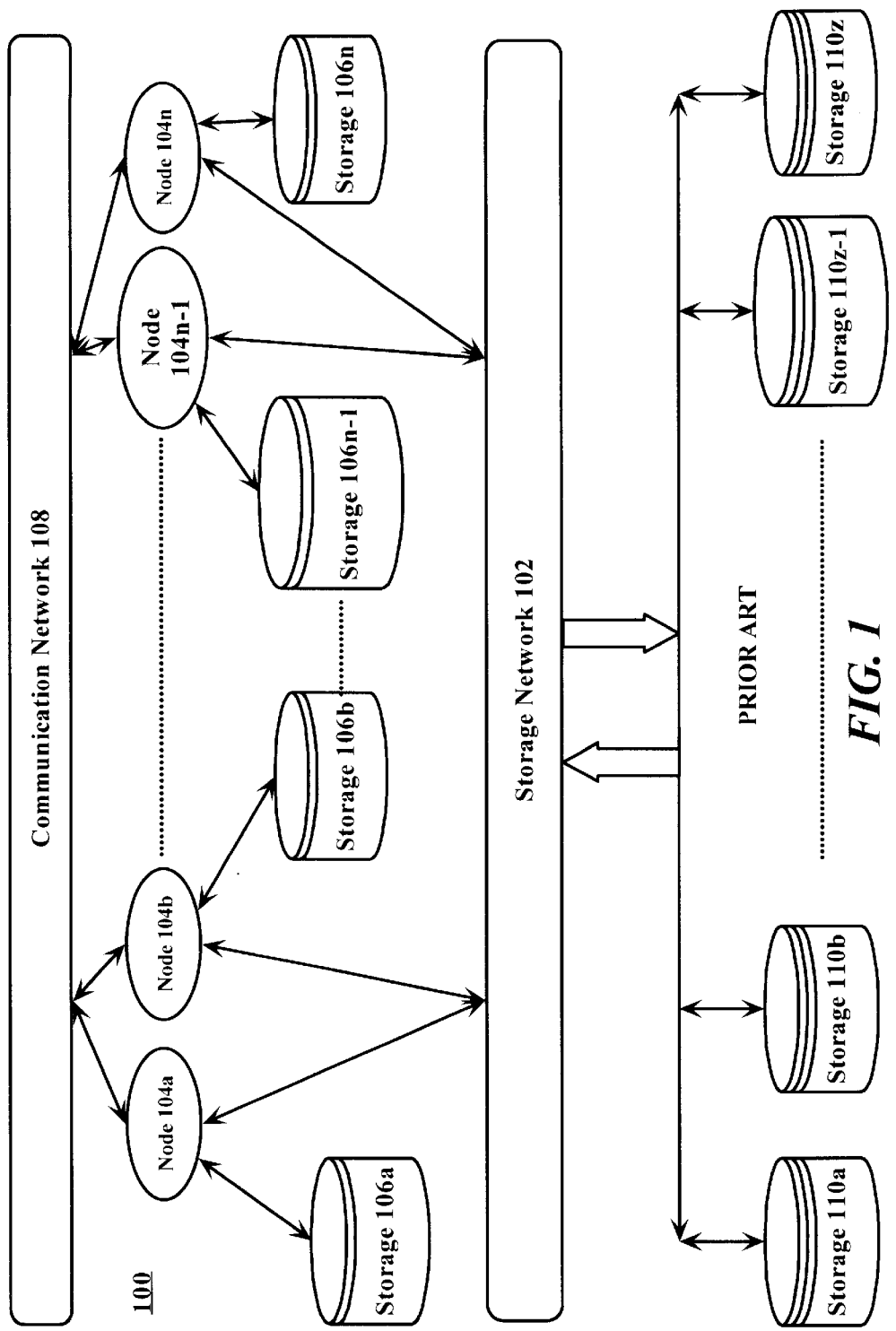
FIG. 1 is a block diagram of system level overview of a typical prior art distributed database processing network within which the present invention may be practiced.
Figure 2:
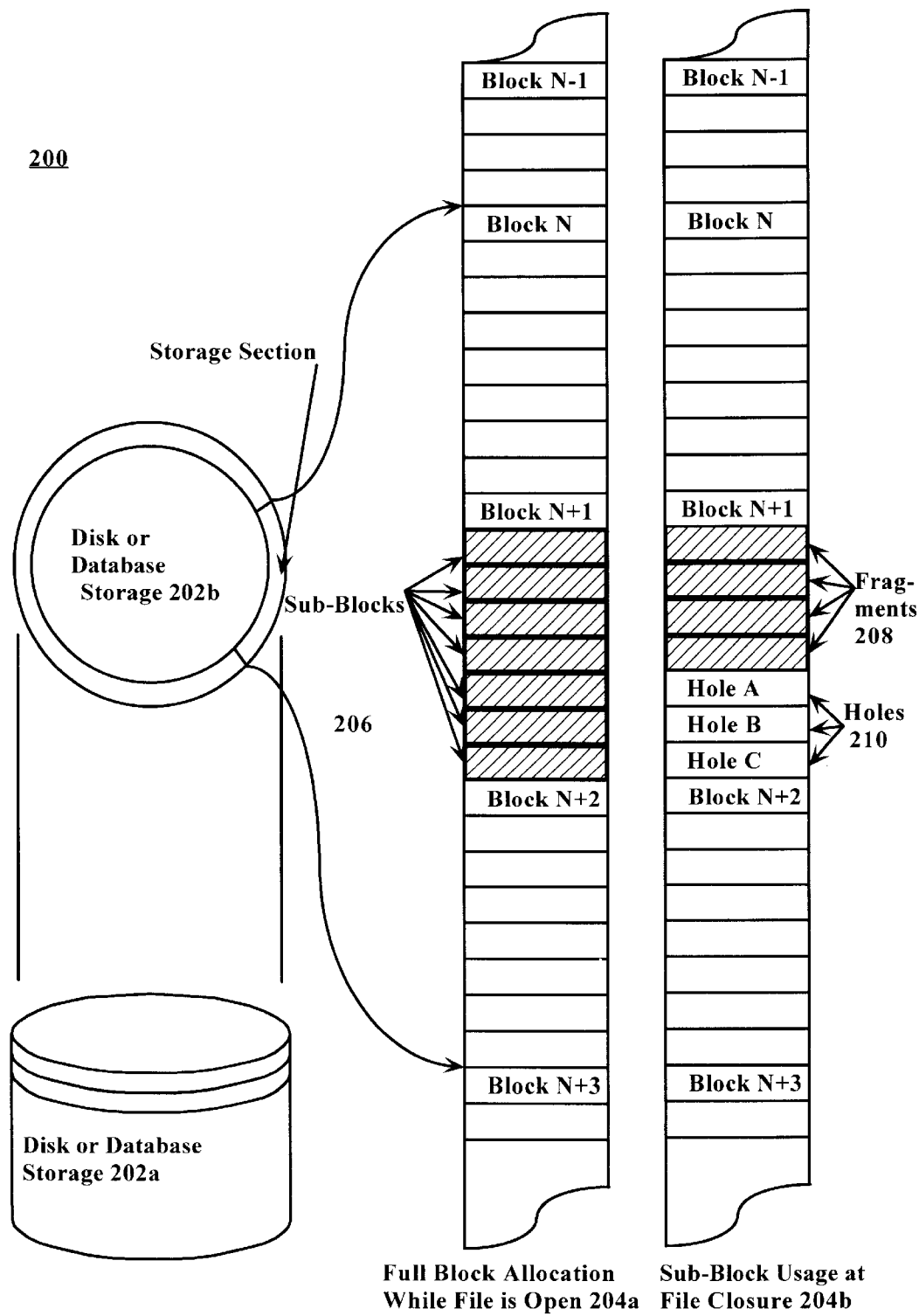
FIG. 2 is a block diagram of a file structure overview illustrating the block and sub-block utilization for a storage device in the prior art within which the invention may be practiced.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Exemplary Embodiment—File System

Figure 3:
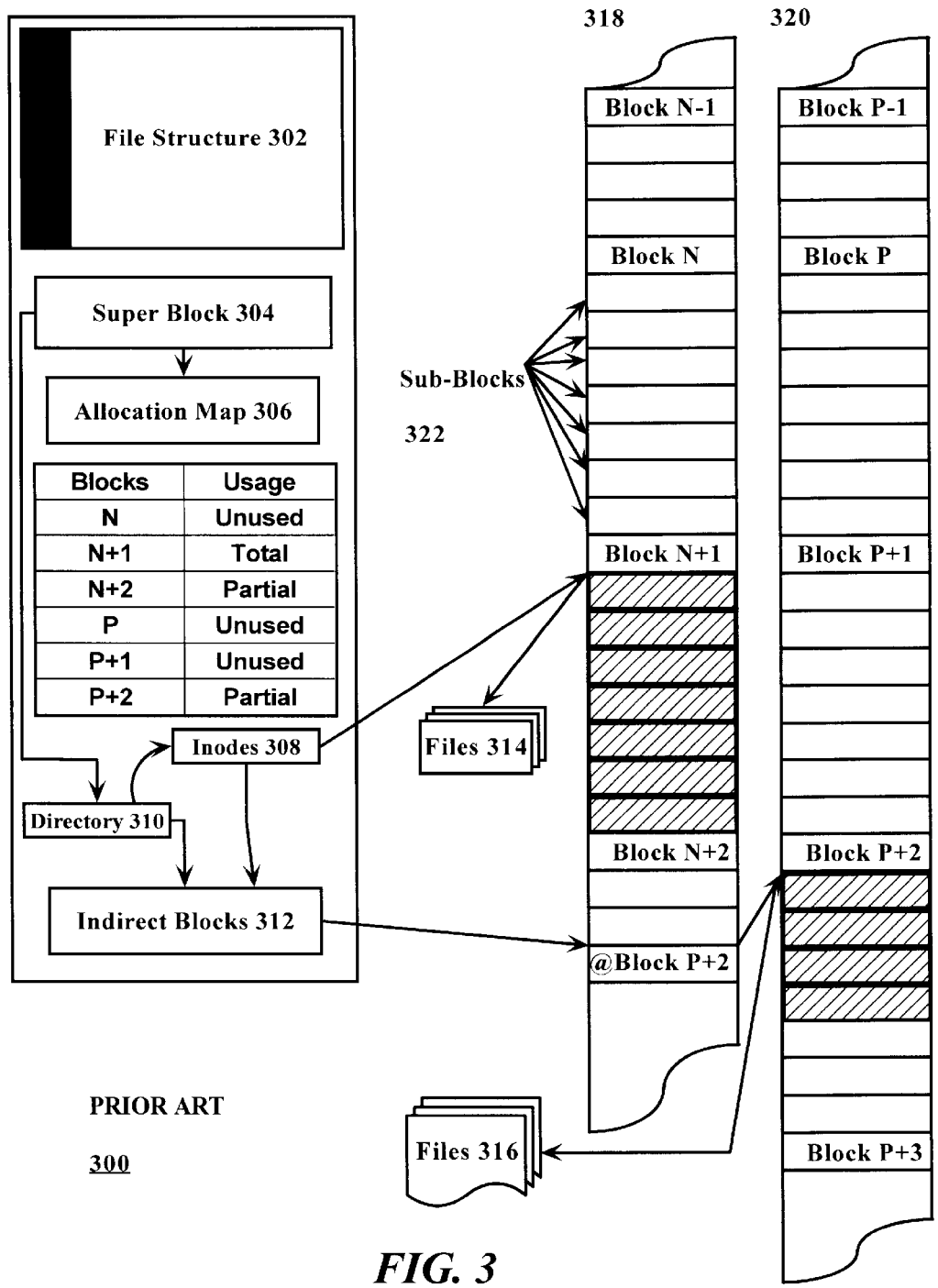
FIG. 3 is a block diagram of a further description of a file system for a storage media found in the prior art within which the invention may be practiced.

FIG. 3 is a block diagram 300 of a further description of a file system for a storage media found in the prior art within which the invention may be practiced. A file system (FIG. 3, 300) is a computer program that allows other application programs to store and retrieve data on media such as disk drives. The term file is used to describe a file is a named data object of arbitrary size. The file system allows application programs to create files and give them names, to store data into them by writing to them, to read data from them, to edit and delete them and perform other operations on them. A file structure (302) is the organization of data on the disk drives. A shared disk file system is one in which a file structure residing on one or more disks is accessed by multiple file systems running on separate computers (or nodes). A shared disk file system allows a computation that uses the file structure to be broken up into multiple pieces that can be run in parallel on multiple nodes. In order to achieve this, rigid serialization of access to resources on the shared disks is required. It is the need for serialization here that makes this Defragmentation Utility solution unique.

In addition to the file data itself, the file structure contains metadata:

a) a directory (310) that maps file name to the corresponding files;

b) file metadata including:
  i. inodes (308) that contain information about the files, most importantly the location of the file data on disk (i.e., which disk blocks hold the file data);
  ii indirect blocks (312) that contain information about the files, most importantly the indirect vector which holds the location of the file data on disk (i.e., which disk blocks hold the file data);

c) an allocation map (306) that records which disk blocks are currently in use to store metadata and file data; and d) a superblock (304) that contains overall information about the file structure (e.g., the locations of the directory, allocation map, and other metadata structures).

Files (314, 316) are represented on disk using inodes, indirect blocks, and data blocks. The inodes of small files also contain the addresses of all disk blocks (disk addresses) that comprise the file data. Large files require one or more levels of indirection to address all their data blocks. In such cases, the inode contains the disk addresses of indirect blocks, which themselves hold either the addresses of data blocks or further levels of indirect blocks. A file system may use large data blocks ensuring that disk seek latency is amortized over large data transfers; this has the expected effect of efficient utilization of disk bandwidth. Further, data blocks can be split into fragments that store small files as well as the last piece of large files thereby improving disk space usage. In order to support fragments and to allow file systems to be configured with indirect blocks smaller than data blocks, each disk block (as shown on storage sections 318, 320: N−1, N, N+1, N+2, N+3, P−1, P, P+1, P+2, P+3) is divided into a fixed number of sub-blocks (322), which can be allocated independently. Hence, the smallest amount of disk storage that can be allocated is one sub-block, and the largest contiguous amount of disk storage that can be allocated is a full block.

Disk addresses of data blocks are represented as a pair [disk number, offset on disk]. The allocation of each disk block and its sub-blocks is maintained in the allocation map. The allocation map is typically stored in an array A, where the value of element A(i,j) denotes the allocation states (allocated/free) of disk block E(i,j). The file system in question is a General Parallel File System (GPFS) for AIX. GPFS allows shared access to files that may span multiple disk drives on multiple SP nodes.

Metadata Updates

Figure 4:
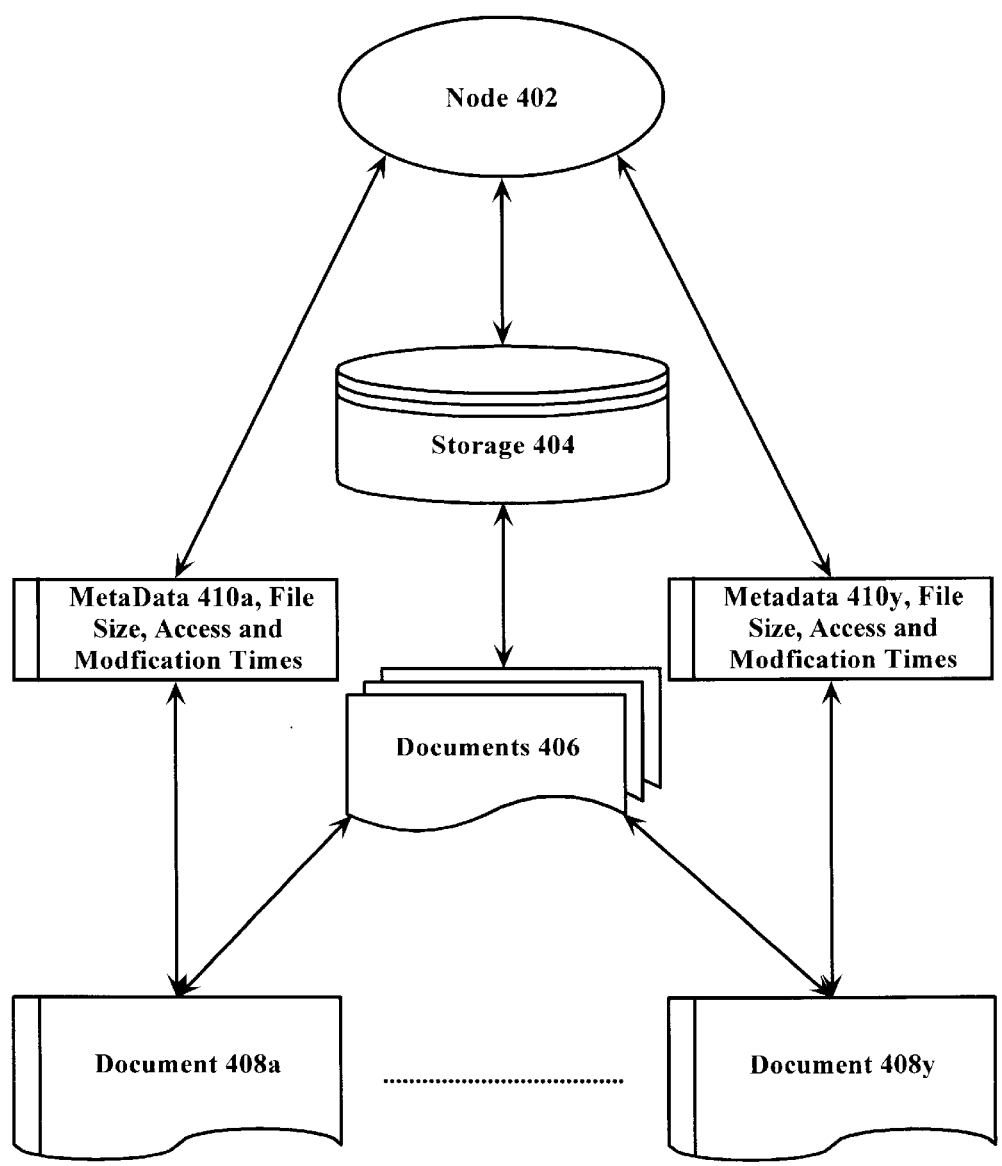
FIG. 4 is a block diagram that illustrates Metanode storage of Metadata as found in the prior art within which the invention may be practiced.

FIG. 4 is a block diagram (400) that illustrates Metanode storage of Metadata as found in the prior art within which the invention may be practiced. When several nodes need to access the same metadata, they may read from and write to different areas of a file (408a to 408y) from a group of documents (406) stored on a storage media (404) only if they present an appropriate lock on the sections to which they are reading from or writing to. The metadata includes the file size, the file access and modification times and the addresses of the file's data blocks (410a to 410y). In GPFS there is the notion of a metadata node or a metanode that is used for managing file metadata for parallel read and write in the shared-disk environment. For each file, a single node is selected as metanode (402) for that file. The metanode keeps information about the file's metadata and is responsible for handling all the I/O activity of metadata from and to the disk (or disks) on which the metadata reside. All the other nodes communicate with the metanode in order to fetch or update metadata information. However, these nodes do not access the metadata information on the disk directly, rather, they access the metadata through communication with the metanode; this has the effect of preventing excessive disk activity which is a considerable performance improvement for a parallel file system.

Write Sharing

GPFS provides fine-grain write sharing support, so that as long as two operations update disjoint byte ranges of a file, they will be allowed to proceed in parallel.

A Defragmentation Utility for Shared Disk File Systems

Defragmentation methods for Storage Area Networks have a number of requirements, namely:

a) they must work on-line, in parallel with other file system activities to avoid having to make the file system unavailable during the operation;

b) they must avoid locking file system data structures for too long to minimize disturbance on the system;

c) they must be memory efficient; Storage Area Networks (SAN) may contain very large file systems and it becomes unfeasible to load complete data structures (such as allocation maps) into memory;

d) they should not require full free blocks to operate, on the contrary, they should be able to work when there is no full free blocks available; finally, e) they must minimize data movements, since data movements imply in disk operations that are expensive disk activities.

To accomplish these goals, an on-line mechanism is provided to combine a number of fragmented blocks into one full block; therefore, this frees up full blocks for allocation. The on-line defragmentation utility allows the user to increase the number of available full blocks without unnecessarily disrupting concurrent disk space allocation and other file system activities on the nodes. In general, GPFS file systems are configured with indirect blocks and directory file data blocks smaller than data blocks; thus, a fragment in a GPFS file system can be the I) last data block of an ordinary file; ii) a data block of a directory file or; iii) an indirect block. Given a disk block number and its allocation map representation, the number of sub-blocks in use is determined; however, there is no immediate way of knowing which and how many files are actually occupying its sub-blocks.

The approach to defragment a file system is to select a fragmented disk block and try to fill its free space (holes) by finding files that have fragments small enough to fit into the hole. The system lookups the whole inode which includes an internal structure that describes an individual file; it contains file size and update information. In another embodiment, the system looks up the addresses of data blocks as well. The defragmentation algorithm is described below:

Defragmentation Algorithm

Figure 5:
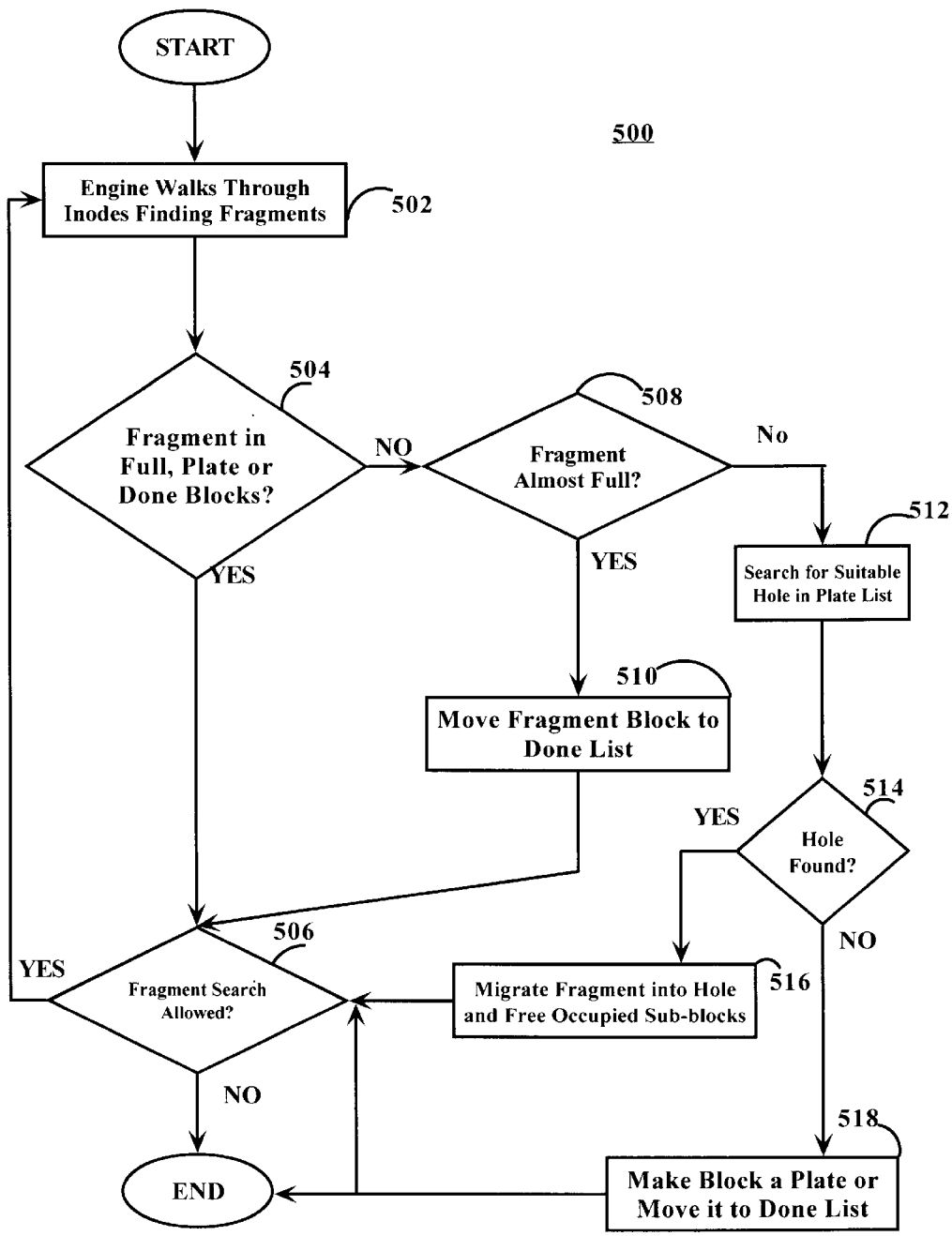
FIG. 5 is a flow diagram that illustrates a functional overview of a Defragmentation Utility as practiced by this invention.

FIG. 5 is a flow diagram (500) that illustrates a functional overview of a Defragmentation Utility as practiced by this invention. The defragmentation engine steps through all the valid inodes and finds each file's fragments. The defragmentation engine decides which fragments must remain in their current location and which fragments should migrate to another location (that is, another disk block). Since the data blocks span across multiple disks, for each valid disk of the file system a set of disk blocks is constructed which are chosen to be filled, herein called plates. When the plates become full or reach a certain fullness, they are removed from the plate set and replaced by other disk blocks. When a disk block is removed from the plate set, it is moved to a "done" list as it is considered "full". While a disk block is in the done list the fragments that belong to that block are not allowed to migrate.

The following discussion details the set of rules that decides that a given disk block is a good candidate for becoming a plate or for having its fragments migrated to other plates. There are two basic data structures maintained by the defragmentation engine:

1) the plate list is a list of a fixed number of disk blocks (plates) currently being filled; each plate also contains information about holes (position and size) found in the corresponding disk block; and 2) the done list is a list of blocks that have already been analyzed, considered "done" and should not be revisited in the near future.

The defragmentation engine driven by fragments being analyzed is outlined below and should be read in conjunction with (FIG. 5).

First, the defragmentation engine steps through all the valid inodes and finds each file's fragments (502). Then a check is made to see if a current fragment belongs to a fully populated disk block, to a plate, or to a "done" block (504); if it does then a check is made to determine if more processing of fragments is permitted by the system (506); otherwise, if it does not belong to one of the aforementioned groups then a check is made to see if a current fragment belongs to an almost full block (508), that is, the block occupation is higher than a preestablished threshold. If the current fragment belongs to an almost full block then (508) the block is moved to the done list (510) and the utility checks to determine if more processing of fragments is permitted by the system (506); otherwise, if the fragment is not almost full (508) then an attempt is made to find a suitable hole (512) (same size as the fragment or larger) in the plate list for the current fragment. If successful (514) in finding a suitable hole then the utility migrates the fragment into that hole (516) and frees the previously occupied sub-blocks; otherwise, if the attempt to find a hole is not successful in finding a suitable one, then the block is made into a plate or moved to the done list (518) and the system checks to determine if more processing of fragments is permitted by the system (506). Finally, if permitted to do so, the defragmentation engine continues to search for fragments.

Back-Off Operation

The defragmentation utility runs on-line concurrently with other file system operations; because of this, it is sometimes necessary to enact a back-off operation in the plate list hole search for the current fragment. This situation could happen when some other file system application removes a file or creates a new small file on the blocks that are currently cached in the plate list. In very large systems, there may be hundreds of computers operating on the same file system creating new files and removing existing files concurrently with the defragmentation operation.

Figure 6:
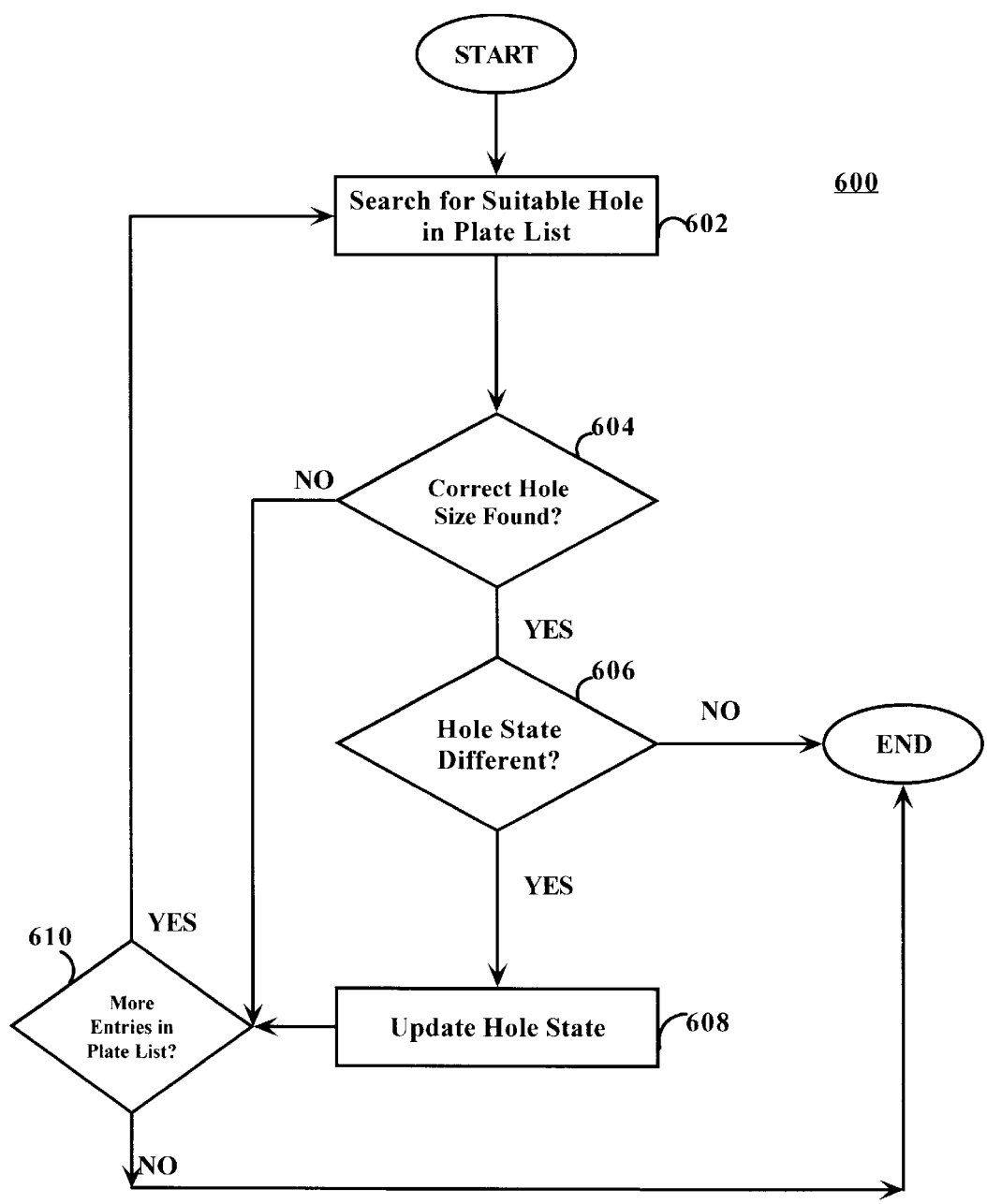
FIG. 6 is a flow diagram that illustrates a functional overview of a hole search for a fragment migration including a Back-off operation as practiced by this invention.

The search operation of FIG. 5 is expounded upon in FIG. 6. Shown in FIG. 6 is a flow diagram (600) that illustrates a functional overview of a hole search for a fragment migration including a Back-off operation as practiced by this invention. The process begins by searching for a suitable hole in a plate list (602). Then a determination is made as to whether or not a hole of the correct size is located (604). If a correct size has not been found then the process cycles through all of the entries in the plate list (610) looking for the next suitable hole size that will fit the fragment. If a hole with the correct size is located then the hole state is checked to determine if it differs from that already recorded (606). If the actual state of the hole found differs from the one recorded by the defragmentation engine, and as a consequence the hole will no longer hold the fragment, then the actual state of the hole is updated (608), and another item on the plate list is reviewed for an appropriate hole (610). The above situation happens when some other file system users have freed or allocated sub-blocks in the disk block containing that hole. Otherwise, if there are no more entries in the plate list or if a hole with the correct size and state is located then the process ends and returns to step (514) of FIG. 5. Also, the process maintains other auxiliary information such as the hole list, i.e., a list of unoccupied sub-blocks currently available on the plates, and the full list, i.e., a list of plates sorted by number of sub-blocks in use. The hole list allows quick searching for a hole of certain size and the full list makes it easier to select a plate in the current set to be replaced. As noted previously, if no hole is found, the disk block for the current fragment could, depending upon the state of a defragmentation engine's lists and the fullness of the block, becomes a plate (replacing an existing plate) or be moved to the done list.

The Defragmentation Utility in Shared Disk File Systems with Tokens

Figure 7:
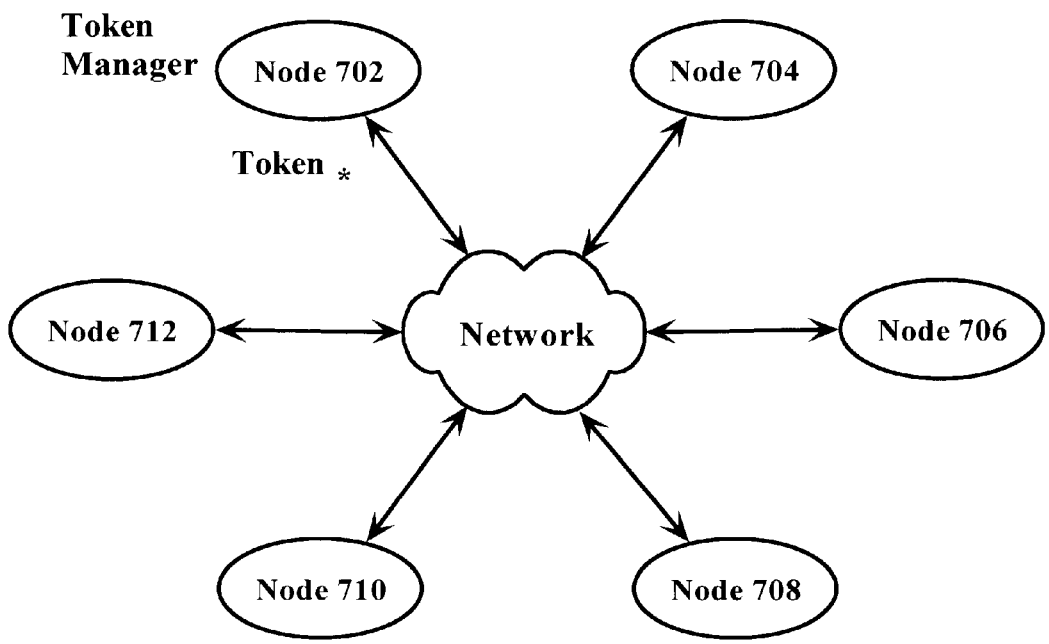
FIG. 7 is a block diagram illustrating a distributed computer network with a token manager as found in the prior art within which the invention may be practiced.
Figure 8:
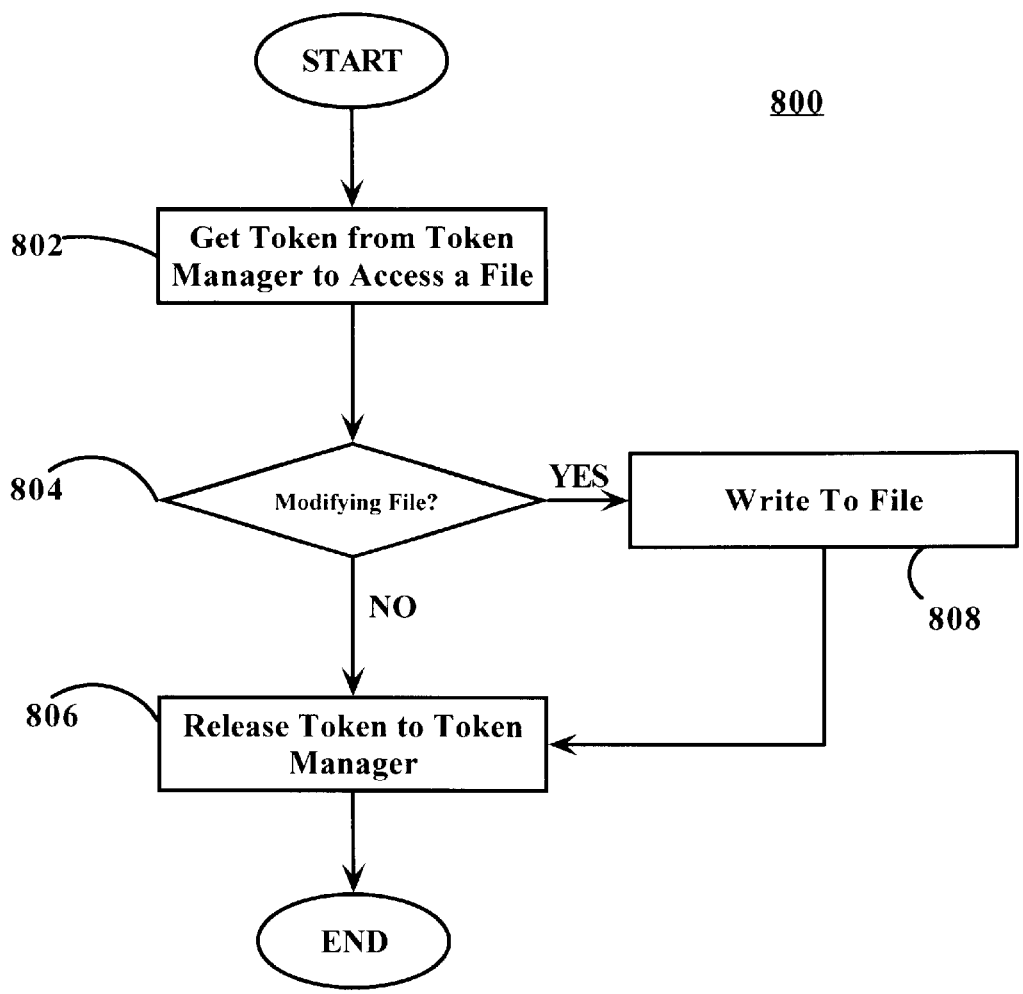
FIG. 8 is a flow diagram illustrating the accessing of a file utilizing a token controlled by a token manager as found in the prior art within which the invention may be practiced.

Next, there is a need for concurrent access to the file system. If the nodes comprising a shared disk file system do not properly synchronize their access to the shared disks, they may corrupt the file structure. FIG. 7 illustrates a token network (700) that utilizes a token or tokens for locking resource access and FIG. 8 illustrates the functional overview of a token distributed processing network (800). Nodes (702, 704, 706, 708, 710, 712) communicate via a network wherein possession of a token controls access to resources. To avoid corrupting the file structure, a node must obtain a token (802) for each block before reading it into memory; tokens are normally obtained from and released to a distributed token manager (702). Then a check is made as to whether or not a node has modified a block (804). If it has modified it, then it must write the block to disk before releasing the tokens (808–806). The defragmentation utility makes use of tokens to guarantee the consistency of the file structure as it moves the fragments from one location to another.

However, it would be desirable not to lock an inode or a data block for the entire duration of file system defragmentation since the duration of the locking of file system resources may affect the outcome of defragmentation. Ideally, if the defragmentation utility has the exclusive use of all the disk blocks being manipulated at a given time, including the current set of plates and the block containing the fragment in analysis, the holes found during defragmentation will not change since there is no other file system operations during the time. As a result, this process adopts the approach where the inode and the data block are only locked when the migration is actually to be carried out. A small tradeoff is that some back-off operations are needed because of other concurrent operations being performed by other processes at the same time.

Also, the algorithm does not require preallocation of extra disk space since it moves fragments in a directed way around the already fragmented disk blocks. The defragmentation utility will still be able to run if there is no full block available in the system. Its performance is better than other prior art algorithms since it avoids extra work in migrating fragments; the extra steps avoided include:

a) moving a fragment within the same disk block; or b) moving a fragment from a fully populated block to a less occupied one; or even c) moving a fragment to one block and then moving the same fragment to a third block. Next, in terms of space utilization, by using a limited (and tunable) number of plates and a limited number of entries in the done list, an upper bound is established for the memory utilization that is independent of the degree of fragmentation of a file system and the size of the file system. This is in sharp contrast to other algorithms that collect fragmentation information prior to performing defragmentation operations.

Further, the algorithm works correctly with a partial view of the current state of the file system, since only a small number of parts of the block allocation map are necessary to be stored in memory. These parts of the block allocation map are the bit maps of the blocks that are currently in the list of plates. This approach is well-suited to SAN files systems, which are often very large file systems requiring huge amounts of space to store their entire data structures. An additional benefit is that the algorithm works independently on sets of disks and it can be performed concurrently by multiple nodes on different sets of disks. Because of the underlying locking mechanism and the layout of the allocation map, multiple nodes can perform disk defragmentation without much interference with each other. Further, the efficiency of plates approach is in term of minimizing the degree of multi-node locks that are required thereby allowing other CPUs to continue executing their processes concurrently with the defragmentation. This because, the algorithm needs a small and limited amount of plates (tens of units), and therefore a small degree of multi-node locks overhead.

There are other defragmentation algorithms available that work within a context of a single computer image. This is the first algorithm which is designed to work within the context of a shared disk file system operating in the context of a storage area network. Thus an improved method and system has been disclosed that overcomes the deficiencies of the prior art methods so that file systems can be defragmented easily and without the performance and space penalties of the prior art.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A method for defragmentation of a shared file system storage network associated with a plurality of processing nodes, the method on a processing node comprising the steps of:
    (a) stepping through file metadata in a file structure in order to find a file fragment, the file fragment being a file or part of a file that occupies m sub-blocks of a disk block, where each disk block is divided into n sub-blocks that can be allocated independently, and m<n; and
    (b) when a file fragment is found, determining if the file fragment is located in a first list or a second list, or if the file fragment is located in a full disk block;
    (c) if the file fragment is not located in the first list or the second list, and the file fragment is not located in a full block, searching for a suitable hole in the first list; and
    (d) if the suitable hole is found in the first list, migrating the file fragment to the suitable hole,
    wherein a full disk block has all of its sub-blocks occupied,
    the first list contains disk blocks each having at least one hole because not all of its sub-blocks are occupied, and
    the second list contains disk blocks in which any file fragments are currently not allowed to be migrated.

2. The method as defined in claim 1, wherein step (c) includes the sub-steps of:
    if the file fragment is not located in the first list or the second list, and the file fragment is not located in a full block, determining if file fragment is located in an almost full disk block;
    if the file fragment is located in an almost full disk block, putting the disk block that includes the file fragment on the second list; and
    if the file fragment is not located in an almost full disk block, searching for a suitable hole in the first list,
    wherein an almost full disk block has at least a predetermined number of its sub-blocks occupied.

3. The method as defined in claim 2, wherein step (d) comprises the sub-steps of:
    if the suitable hole has been found, determining if a current state of the hole is different than that recorded in the first list;
    if the current state is not different, migrating the file fragment into the suitable hole, and freeing the sub-blocks previously occupied by the file fragment; and
    if the current state is different, updating the current state of the hole, and checking the first list again to search for another suitable hole in the first list.

4. The method as defined in claim 3, further comprising the step of:
    (e) if a suitable hole is not found in the first list, putting the disk block that contains the file fragment on one of the first list and the second list based upon predetermined criteria.

5. The method as defined in claim 1, wherein in step (a), the file metadata is stepped through by stepping through inodes that each contain information about the location of file data.

6. The method as defined in claim 1, wherein step (a) is repeated as long as access to the storage network is allowed.

7. The method as defined in claim 1, further comprising the step of:
    (e) if a suitable hole is not found in the first list, putting the disk block that contains the file fragment on one of the first list and the second list based upon predetermined criteria.

8. A computer readable medium including programming instructions for defragmentation of a shared file system storage network associated with a plurality of processing nodes, the programming instructions for execution on a processing node comprising instructions for performing the steps of:
    (a) stepping through file metadata in a file structure in order to find a file fragment, the file fragment being a file or part of a file that occupies m sub-blocks of a disk block, where each disk block is divided into n sub-blocks that can be allocated independently, and m<n; and (b) when a file fragment is found, determining if the file fragment is located in a first list or a second list, or if the file fragment is located in a full disk block;

(c) if the file fragment is not located in the first list or the second list, and the file fragment is not located in a full block, searching for a suitable hole in the first list; and (d) if the suitable hole is found in the first list, migrating the file fragment to the suitable hole, wherein a full disk block has all of its sub-blocks occupied, the first list contains disk blocks each having at least one hole because not all of its sub-blocks are occupied, and the second list contains disk blocks in which any file fragments are currently not allowed to be migrated.

9. The computer readable medium as defined in claim 8, wherein step (c) includes the sub-steps of:

if the file fragment is not located in the first list or the second list, and the file fragment is not located in a full block, determining if file fragment is located in an almost full disk block;

if the file fragment is located in an almost full disk block, putting the disk block that includes the file fragment on the second list; and if the file fragment is not located in an almost full disk block, searching for a suitable hole in the first list, wherein an almost full disk block has at least a predetermined number of its sub-blocks occupied.

10. The computer readable medium as defined in claim 9, wherein step (d) comprises the sub-steps of:

if the suitable hole has been found, determining if a current state of the hole is different than that recorded in the first list;

if the current state is not different, migrating the file fragment into the suitable hole, and freeing the sub-blocks previously occupied by the file fragment; and if the current state is different, updating the current state of the hole, and checking the first list again to search for another suitable hole in the first list.

11. The computer readable medium as defined in claim 10, further comprising instructions for performing the step of:

(e) if a suitable hole is not found in the first list, putting the disk block that contains the file fragment on one of the first list and the second list based upon predetermined criteria.

12. The computer readable medium as defined in claim 8, wherein in step (a), the file metadata is stepped through by stepping through inodes that each contain information about the location of file data.

13. The computer readable medium as defined in claim 8, wherein step (a) is repeated as long as access to the storage network is allowed.

14. The computer readable medium as defined in claim 8, further comprising instructions for performing the step of:

(e) if a suitable hole is not found in the first list, putting the disk block that contains the file fragment on one of the first list and the second list based upon predetermined criteria.

15. A method for backing-off of a defragmentation of a shared file system storage network associated with a plurality of processing nodes, the method on a processing node comprising the steps of:

stepping through file metadata in a file structure in order to find a file fragment, the file fragment being a file or part of a file that occupies m sub-blocks of a disk block, where each disk block is divided into n sub-blocks that can be allocated independently, and m<n; and when a file fragment is found, searching for a suitable hole in a first list;

if the suitable hole has been found, determining if a current state of the hole is different than that recorded in the first list;

if the current state is not different, migrating the file fragment into the suitable hole, and freeing the sub-blocks previously occupied by the file fragment; and if the current state is different, updating the current state of the hole, and checking the first list again to search for another suitable hole in the first list.

16. The method as defined in 15, wherein the first list contains disk blocks each having at least one hole because not all of its sub-blocks are occupied.

17. The method as defined in claim 16, further comprising the step of:

if a suitable hole is not found in the first list, putting the disk block that contains the file fragment on one of the first list and the second list based upon predetermined criteria.

18. The method as defined in claim 15, wherein tokens are used to grant a temporary access lock to disk blocks of the shared file system storage network.

19. The method as defined in claim 15, wherein the defragmentation of a shared file system storage network operates as a background process to normal system operations.

20. A shared file system storage network associated with a plurality of processing nodes, a processing node for defragmenting shared files comprising:

an interface to one or more file storage systems;

means for stepping through file metadata in a file structure on the storage network in order to find a file fragment, the file fragment being a file or part of a file that occupies m sub-blocks of a disk block, where each disk block is divided into n sub-blocks that can be allocated independently, and m<n;

means for, when a file fragment is found, determining if the file fragment is located in a first list or a second list, or if the file fragment is located in a full disk block;

means for, if the file fragment is not located in the first list or the second list, and the file fragment is not located in a full block, searching for a suitable hole in the first list; and means for, if the suitable hole is found in the first list, migrating the file fragment to the suitable hole, wherein a full disk block has all of its sub-blocks occupied, the first list contains disk blocks each having at least one hole because not all of its sub-blocks are occupied, and the second list contains disk blocks in which any file fragments are currently not allowed to be migrated.

* * * * *

UNITED STATES PATENT AND TRADEMARK OFFICE
CERTIFICATE OF CORRECTION

PATENT NO. : 6,571,261 B1
DATED : May 27, 2003
INVENTOR(S) : Kuei-Yu Wang-Knop et al.

It is certified that error appears in the above-identified patent and that said Letters Patent is hereby corrected as shown below:

<u>Title page,</u>
Item [57], ABSTRACT,
Line 6, from "invention," to -- invention --

<u>Column 1,</u>
Line 39, from "Multiples" to -- Multiple --

<u>Column 2,</u>
Line 66, from "of." to -- of --

<u>Column 4,</u>
Line 16, from "file" to -- file, which --

<u>Column 6,</u>
Line 4, from "I)" to -- i) --
Line 14, from "lookups" to -- looks up --

<u>Column 8,</u>
Line 57, from "term" to -- terms --
Line 60, from "This because," to -- This is because --

<u>Column 9,</u>
Line 35, from "program or logic or language," to -- program, logic, language, --
Line 39, from "invention" to -- invention, --

Signed and Sealed this

Eleventh Day of November, 2003

JAMES E. ROGAN
*Director of the United States Patent and Trademark Office*